(12) United States Patent
Senga

(10) Patent No.: US 7,705,737 B2
(45) Date of Patent: Apr. 27, 2010

(54) OBJECT IDENTIFYING DEVICE, MOBILE PHONE, OBJECT IDENTIFYING METHOD, PROGRAM EXECUTABLE ON COMPUTER FOR OPERATING THE OBJECT IDENTIFYING DEVICE AND COMPUTER-READABLE MEDIUM INCLUDING THE PROGRAM

(75) Inventor: Masahiro Senga, Kyoto (JP)

(73) Assignee: OMRON Corporation, Kyoto (JP)

( * ) Notice: Subject to any disclaimer, the term of this patent is extended or adjusted under 35 U.S.C. 154(b) by 1078 days.

(21) Appl. No.: 11/376,253

(22) Filed: Mar. 15, 2006

(65) Prior Publication Data

US 2006/0210258 A1 Sep. 21, 2006

(30) Foreign Application Priority Data

Mar. 15, 2005 (JP) ............................. 2005-074032

(51) Int. Cl.
G08B 23/00 (2006.01)
(52) U.S. Cl. .................................. 340/573.4; 340/573.1
(58) Field of Classification Search .............. 340/573.1, 340/573.4, 573.5, 573.7, 407.1, 407.2, 5.52, 340/5.53, 5.8, 5.81, 5.82, 5.83; 382/118, 382/209
See application file for complete search history.

(56) References Cited

U.S. PATENT DOCUMENTS

| | | | |
|---|---|---|---|
| 4,103,307 A * | 7/1978 | Shinoda et al. ............. 396/227 |
| 4,975,969 A | 12/1990 | Tal | |
| 5,870,723 A | 2/1999 | Pare, Jr. et al. | |
| 6,433,818 B1 | 8/2002 | Steinberg et al. | |
| 6,820,137 B2 * | 11/2004 | Nakamura et al. ............. 710/1 |
| 6,975,755 B1 * | 12/2005 | Baumberg .................. 382/154 |
| 7,190,814 B2 * | 3/2007 | Miichi et al. ................. 382/118 |
| 7,340,342 B2 * | 3/2008 | Skarine ....................... 701/211 |
| 7,430,307 B2 * | 9/2008 | Mizobuchi ................... 382/124 |

(Continued)

FOREIGN PATENT DOCUMENTS

CN 1299496 6/2001

(Continued)

OTHER PUBLICATIONS

Abstract of JP2003036442, Data supplied from the esp@cenet database, 1 page, Feb. 7, 2003.

(Continued)

Primary Examiner—Van T. Trieu
(74) Attorney, Agent, or Firm—Osha • Liang LLP

(57) ABSTRACT

An object identifying device includes: an input request unit for requesting an input for starting a shooting operation; an input unit for receiving the input for starting the shooting operation and a control unit for controlling them. The control unit performs a truth and falseness deciding process for comparing an input operation of the input for starting the shooting operation that is received by the input unit with a normal operation previously registered as a normal operation to decide a truth or a falseness, a matching process for matching the object on the basis of the shot image obtained by the shooting operation and the registered data of the object that is previously registered and an identifying process for identifying the object to be relevant when both a decided result by the truth and falseness deciding process and a matched result by the matching process are true.

10 Claims, 10 Drawing Sheets

U.S. PATENT DOCUMENTS

2004/0162982 A1 8/2004 Komai
2004/0218070 A1 11/2004 Hamalainen

FOREIGN PATENT DOCUMENTS

| JP | 2003-36442 | 2/2003 |
| JP | 2004-15450 | 1/2004 |

OTHER PUBLICATIONS

Patent Abstracts of Japan; Publication No. 2004015450; Publication Date: Jan. 15, 2004 (1 page).
Extended European Search Report; dated Jul. 18, 2006; Application No. 06111171.2 (8 pages).
Chinese Office Action for Chinese Application No. 200610059137, mailed on Aug. 10, 2007 (24 pages).

* cited by examiner

OBJECT IDENTIFYING DEVICE, MOBILE PHONE, OBJECT IDENTIFYING METHOD, PROGRAM EXECUTABLE ON COMPUTER FOR OPERATING THE OBJECT IDENTIFYING DEVICE AND COMPUTER-READABLE MEDIUM INCLUDING THE PROGRAM

The present application claims foreign priority based on Japanese Patent Application No. 2005-074032, filed Mar. 15, 2005, the content of which is incorporated herein by reference.

BACKGROUND OF THE INVENTION

1. Technical Field

The present invention relates to an object identifying method, an object identifying device, and a mobile phone for shooting an object to be shot such as the face, the iris or the palm mark of a human being to identify the object.

2. Related Art

As a system for identifying the person himself or herself, various kinds of identifying systems have been hitherto proposed. For instance, exemplified are a face identifying system for shooting a face to identify the face of the person himself or herself, an iris identifying system for shooting an iris to identify the iris of the person, a palm mark identifying system for shooting a palm mark to identify the palm mark of the person, etc.

These identifying systems serve to identify the person himself or herself by shooting an object to be shot such as the face, the eye or the hand. Thus, an impersonation by photographs or a wrong recognition needs to be rejected.

As a method for rejecting the impersonation or the wrong recognition, an individual identifying device for matching a plurality of objects is proposed (see JP-A-2003-36442). In the individual identifying device, not only a plurality of matching is matched, but also a matching process is carried out again when there is an indefinite part so as to suppress a wrong recognition rate to a low level.

However, when a plurality of matching processes is performed, a problem arises that not only much processing time, but also a labor is required for a user.

SUMMARY OF THE INVENTION

It is an object of the present invention to provide an object identifying method, an object identifying device, a mobile phone, an object identifying program, and a computer-readable medium including the object identifying program in which an impersonation or a wrong recognition can be easily rejected.

However, the present invention need not achieve the above objects, and other objects not described herein may also be achieved. Further, the invention may achieve no disclosed objects without affecting the scope of the invention.

The present invention concerns an object identifying method, an object identifying device or an object identifying program having a shooting unit for shooting an object to be shot to identify the object on the basis of a shot image obtained by shooting the object to be shot by the shooting unit. The object identifying method, the object identifying device or the object identifying program comprises: an input request unit for requesting an input for starting a shooting operation; an input unit for receiving the input for starting the shooting operation and a control unit for controlling them and is characterized in that the control unit performs a truth and falseness deciding process for comparing an input operation of the input for starting the shooting operation that is received by the input unit with a normal operation previously registered as a normal operation to decide a truth or a falseness, a matching process for matching the object on the basis of the shot image obtained by the shooting operation and the registered data of the object that is previously registered and an identifying process for identifying the object to be relevant when both a decided result by the truth and falseness deciding process and a matched result by the matching process are true.

The input request unit can be formed with a display device such as a liquid crystal monitor for displaying images, for instance, characters or figures, a CRT monitor or a digital display device, an audio output device such as a speaker for outputting sound, a lighting device such as a turned on/turned off LED or a plurality of combinations of them.

The input unit can be formed with a push button for receiving an input of pressing down, a touch panel for receiving an input of touch, a sensor for detecting a contact of an object, an audio detector such as a microphone for detecting an input of audio or a plurality of combinations of them.

The normal operation can be constructed by a kind of the input (a kind indicating which of the push buttons is pressed down or the position of an inputted touch), a sequence of inputs (a sequence of pressing down a plurality of push buttons or a sequence of touch positions of the touch panel), a timing of an input, a time interval from ON of the input to OFF of the input or a plurality of combinations of them.

According to the above-described structure, a truth and falseness decision can be carried out by an input operation as well as a matching by the shot image so that an identifying accuracy can be improved.

Since the input operation is an operation for the input for starting the shooting operation, even when an impersonation is attempted by an illegal user, if the input operation is used for deciding the truth and the falseness, the illegal user is allowed not to be conscious thereof and the impersonation can be rejected.

Furthermore, since the input operation of the input for starting the shooting operation is used to decide the truth and the falseness, the improvement of convenience is compatible with the improvement of the identifying accuracy without requiring a labor for the user.

According to an aspect of the present invention, the normal operation may be composed of other input operation than an ordinary shutter button pressing down operation.

Thus, an unjust use can be easily rejected. That is, when the illegal user tries to impersonate by using a photograph, if the input is requested for starting the shooting operation, a shutter button is ordinarily pressed down. Therefore, even when the photograph that may be possibly recognized as the person himself or herself in the matching of the object to be shot, the unjust use can be assuredly rejected.

Further described, while the person himself or herself sleeps, even when the person himself or herself is shot to illegally use a shot image, the illegal use can be rejected in accordance with the decision of the truth and falseness of the input operation.

According to another aspect of the present invention, the input unit may be composed of a push button and the normal operation may be composed of a pressing down time until the push button is released after the push button is pressed down.

The pressing down time can be composed of a time before the shooting operation is started, or a time after the shooting operation is finished. Specifically described, for instance, the shooting operation can be performed by the shooting unit after the pressing down operation of the push button is released. Further, under a state that the push button is pressed down, the shooting operation may be performed immediately after the push button is pressed down or after a prescribed time elapses. The pressing down time can be composed of a time until the push button is released after the shooting operation is performed.

According to the above-described structure, the impersonation by the unjust user can be properly rejected. Especially, since the present invention has a special quality that the truth or falseness is decided on the basis of a time such as the pressing down time, what degree of time is required for identifying the object to be true is hardly estimated. If the unjust user knows that the coincidence of the pressing down time is necessary, the user does not understand a decision standard as to whether the pressing down times may be sequentially tested in one second or in 0.5 seconds. Accordingly, the user can be made to abandon the unjust use.

Further, according to a still another aspect of the present invention, the matching process may be performed only when the result by the truth and falseness deciding process is decided to be true.

Thus, the number of times of performing the matching of the object that takes much processing time and has a complicated algorithm can be reduced and a load necessary for a process can be suppressed to a minimum. Especially, when the object identifying device is mounted on a mobile information terminal such as a mobile phone or a PDA, the power consumption of a battery (a battery charger) can be suppressed to a minimum.

Further, according to a still another aspect of the present invention, the control unit may perform a normal operation register process for permitting the normal operation to be registered.

Thus, a user can freely register the normal operation so that the user can more properly prevent the impersonation by another person.

Further, the present invention may provide a face identifying device including the object identifying device in which a face is shot by the shooting unit as the object to be shot.

Thus, the impersonation by a photograph can be properly rejected by the identification of the face that causes a mental resistance less than a fingerprint or an iris and easily accepted from the custom such as a permission of a known person or a permission of a popular person.

Further, according to the present invention, a mobile phone having the object identifying device may be provided.

Thus, the illegal use of the mobile phone can be prevented

According to the present invention, the impersonation or the wrong recognition can be easily rejected.

DETAILED DESCRIPTION OF THE INVENTION

Embodiments of the present invention will be described below together with the drawings.

First Embodiment

Figure 1:
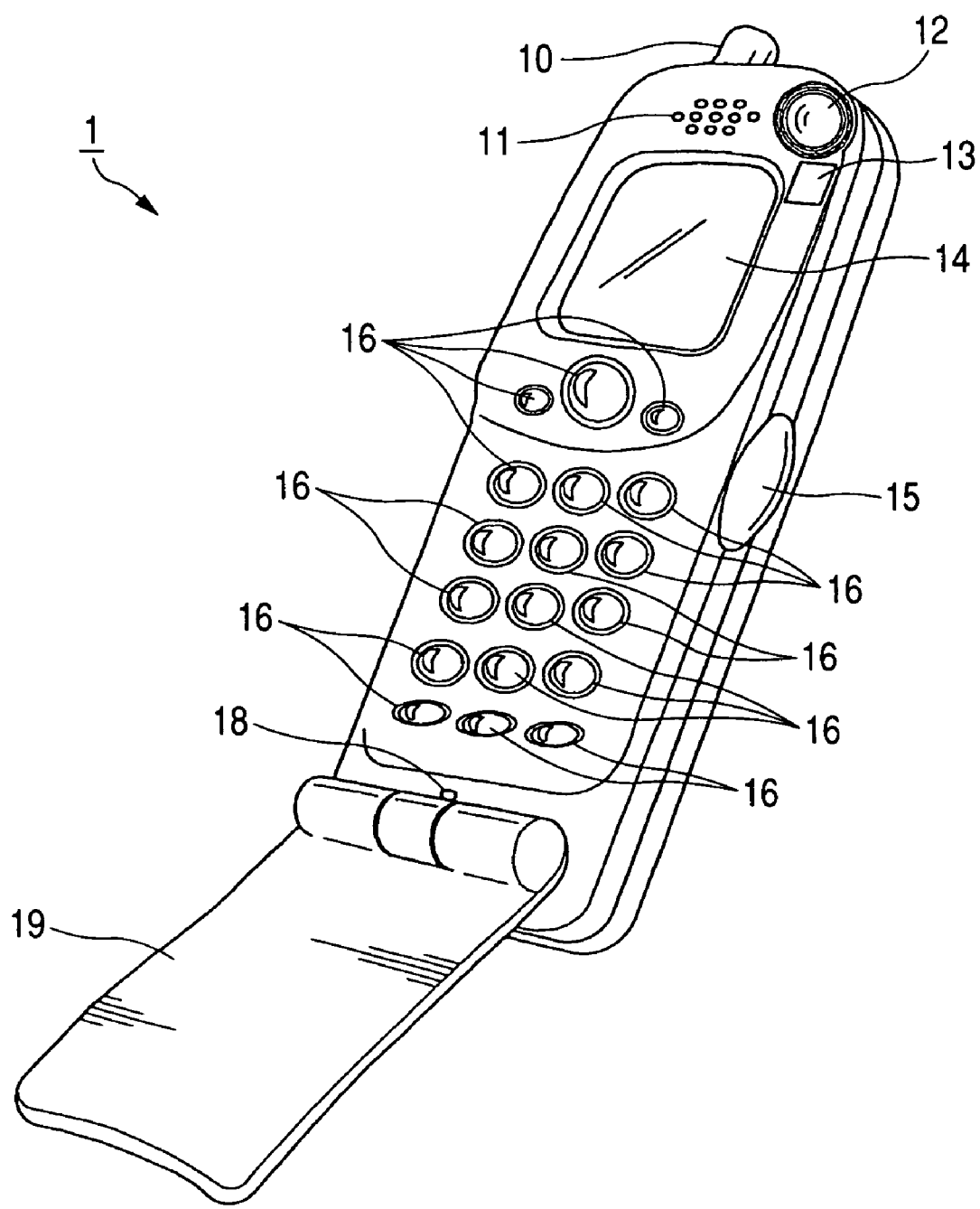
FIG. 1 is a perspective view of an object identifying device according to a first exemplary, non-limiting embodiment of the present invention.

Firstly, the structure of an object identifying device 1 will be described by referring to a perspective view of the object identifying device 1 shown in FIG. 1.

The object identifying device 1 is composed of a mobile phone as a kind of a mobile information terminal. On a front surface, an audio outputting speaker 11, a liquid crystal monitor 14 for displaying an image, a plurality of operating buttons 16 for inputting an operation and an audio inputting microphone 18 are provided in order from an upper part.

In the right side of the speaker 11, a shooting camera 12 and a lighting device 13 are provided closely upward and downward. The shooting camera 12, the lighting device 13 and the liquid crystal monitor 14 are arranged so as to be provided on the same surface (a front surface in this embodiment) as that of the object identifying device 1 and the shooting direction of the camera 12, the lighting direction of the lighting device 13 and the display direction of the liquid crystal monitor 14 are designed to be located in the same direction. The lighting device 13 is formed with a suitable lighting device such as a flash lighting device for flashing or a lighting device for lighting (for instance, an LED or a fluorescent lamp).

Further, on the right side of the object identifying device 1, a shutter button 15 of the camera 12 is provided. To the lower part of the front surface of the object identifying device 1, an opening and closing cover 19 rotating backward and forward is pivotally attached. Under a state that the opening and closing cover 19 is closed, the plurality of operating buttons 16 are covered and protected therewith.

On the upper part of the back surface of the object identifying device 1, an antenna 10 for a radio communication is provided. Then, in the object identifying device 1, a controller or a battery charger is provided. In the controller, a storing part is also provided. In the storing part, a data base is stored in which an identifying register program for registering identifying data, an object identifying program for identifying an object to be shot by a shooting and input operations and matching data for matching a face as a kind of a biological identification or normal operation data for deciding a truth and falseness of an input operation are registered.

Further, a storage medium in which the object identifying program is stored such that the computer can read it may be supplied to the object identifying device 1 and allowed the controller of the object identifying device 1 to read out the program stored in the storage medium and to execute it.

The storage medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the object identifying device 1 may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network.

With the above-described structure, the object identifying device 1 can transmit data by operating the operating buttons 16, receive data by the operation of the operating buttons 16 and permit an audio communication with a telephone at a remote place. Further, the operating buttons 16 are operated so that contents can be displayed by connecting to an Internet or an electronic mail can be transmitted and received.

Then, a still image or a moving image can be shot by the camera 12 and the shot image can be displayed on the liquid crystal monitor 14. This shooting operation can be started by the input operation by the shutter button 15 or the operating buttons 16. Thus, an individual can be identified by the shooting operation or the input operation.

Now, the structure of the object identifying device 1 will be described by referring to a block diagram of the object identifying device 1 shown in FIG. 2. In this explanation, elements related to a shooting function and an identifying function necessary for identifying an individual will be described and the description of other elements will be omitted.

The object identifying device 1 includes an input part 41, an input deciding part 42, an image part 43, a face matching part 44 and an identified result output part 45.

The input part 41 is formed with the shutter button 15 (FIG. 1) and the operating buttons 16 (FIG. 1) to transmit an input signal to the input deciding part 42.

The input deciding part 42 is provided in the controller of the object identifying device 1 and decides a truth and falseness as to whether or not the input operation received by the input part 41 corresponds to a normal operation stored in the controller.

The image part 43 is formed with the camera 12 (FIG. 1) and shoots the object to be shot to obtain the shot image and transmits the shot image to the face matching part 44.

The face matching part 44 is provided in the controller of the object identifying device 1 and compares the shot image obtained from the image part 43 with matching data (dictionary data) stored in the controller to match a face. The matching data is previously registered shot image data of a user. In this embodiment, as the matching data, the image of the face that does not cause a mental resistance to the user is employed. The matching data is not limited to the image data and may be composed of feature data obtained by extracting a feature point or a feature amount from the image data.

The identified result output part 45 outputs an identified result identified on the basis of a decided result of the decision of truth and falseness by the input deciding part 42 and a matched result of the matching of the face by the face matching part 44. The identified result is determined to be relevant when both the decision of the truth and falseness and the matching of the face are true and the identified result is determined to be irrelevant when either of them is false.

When the decision of the truth and falseness is determined to be false, the matching of the face may not be performed. In this case, the identified result may be determined to be irrelevant.

According to the above-described structure, a double identification can be carried out on the basis of the input operation by a user and the shot image obtained by shooting the user (the object to be shot) and an impersonation or a wrong recognition can be properly rejected.

Now, an operation of an identifying register process performed by the controller in accordance with an identifying register program will be described together with a flowchart showing an operation performed by the controller of the object identifying device 1 shown in FIG. 3.

The identifying register process shows a part of a function setting process prepared in the object identifying device 1 and is performed when the user selects the identifying register process from the function setting process.

When the identifying register process is started, the controller activates the camera 12 to shoot the face of the object to be shot and obtain the image of the face as the shot image (step n1). At this time, the controller may requests an input for starting a shooting operation to perform the shooting operation by the input for starting the shooting operation by the shutter button 15.

The controller registers the obtained shot image in a data base (DB) in the controller as the matching data (step n2).

The controller requests the user to designate the normal operation to be registered by displaying a screen on the liquid crystal monitor 14 and registers the designated operation as a normal operation serving as a shutter function of the camera 12 (step n3).

The normal operation is designated by allowing the user to actually perform the input operation and the input operation is directly designated as the normal operation. Otherwise, a plurality of kinds of the normal operations is displayed on the liquid crystal monitor 14 so that an arbitrary normal operation is selected by the user to be performed.

The normal operation that can be designated may be composed of an operation for pressing down any one of a plurality of operating buttons 16, an operation for pressing down a plurality of operating buttons 16 selected among the plurality of the operating buttons 16 or an operation for pressing down the plurality of the operating buttons 16 selected among the plurality of the operating buttons 16 in a designated order. The normal operation may sometimes include an operation for pressing down the shutter button 15.

The normal operation is preferably performed by pressing down any one of the operating buttons 16 in such a way that an illegal user does not understand that the input operation constitutes a condition for decision and by considering the convenience of the user.

According to the above-described operations, normal operation data and the matching data can be stored in the data base.

The normal operation may not be separately designated in the step n3 and the input operation for starting the shooting operation may be obtained at the time of the step n1 and the input operation may be directly registered as the normal operation. In this case, the normal operation data and the matching data can be registered in the same procedure as that when the object is actually identified.

Now, the operation of the identifying register process performed by the controller in accordance with the identifying register program will be described together with a flowchart showing the operation performed by the controller of the object identifying device 1 shown in FIG. 4.

The controller waits until an identifying process is started (step s1:No). This identifying process is designed to be started at a preset suitable timing, for instance, when the object identifying device 1 is used, when a power is turned on, when a mail is transmitted, when a mail is read, when a WEB is inspected, when a setting is changed, when registered personal information is referred to, when charged contents provided in the WEB are used, or when goods are bought on the WEB.

Figure 5A:
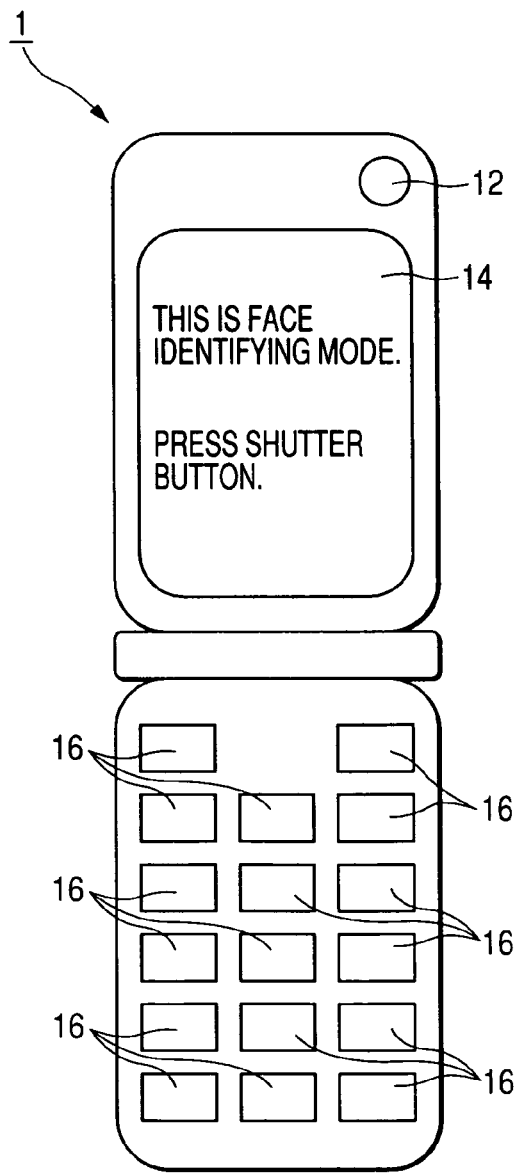
FIGS. 5A and 5B are explanatory views for explaining a display of a exemplary, non-limiting liquid crystal monitor.

When the identifying process is started (step s1:Yes), the controller activates the camera 12 (step s2) to display "Press the shutter button" on the liquid crystal monitor 14, as shown in a front view of FIG. 5A to instruct the user to input for starting the shooting operation (step s3).

The controller performs a truth and falseness decision as to whether or not the input operation inputted by the shutter button 15 or the operating button 16 corresponds to a designated button registered as the normal operation (step s4).

When the controller decides that the input operation corresponds to the normal operation and is true (step 4:Yes), the controller performs the shooting operation by the camera 12 (step s5) to match the face on the basis of the shot image and the matching data obtained by the shooting operation (step s6).

In comparing the image data of the face with the matching data, a feature amount peculiar to the person himself or herself is obtained from the shot image and compared (matching) with the feature amount of the matching data. When the difference in feature amount between them is located within a preset and fixed threshold value, the person is decided to be the same person.

The feature amount peculiar to the person himself or herself or herself can be obtained by employing, for instance, a gabble-wavelet conversion to a feature point obtained from the image of the face of the shot image. The feature point can be obtained by cutting a face part from a rough position of the face, and normalizing the size of the face, applying a detailed graph thereto to specifically detect the position of the feature point of the face. The gabble-wavelet conversion is a method used for analyzing a signal or compressing an image in which a wavelet wave form is used for an object to be converted to extract only a feature (a frequency component or the like) of the wave form from the object to be converted.

The controller decides whether or not the face of the user is a registered face (whether the user is the same person or not) on the basis of the matched result of the matching of the face. When the face is the registered face (step s7:Yes), the controller performs an identification success process (step s8) and finishes processes. In the identification success process, the user may directly shift to a function to be used by the user or after the success of an identification is displayed on the liquid crystal monitor 14, the user may shift to a function to be used by the user. Accordingly, the user can employ functions such as turning on a power, a transmission of a mail, an inspection of a WEB, a change of a setting or a reference to registered personal information. Further, according to circumstances, as a result of the success of an identification, the user can complete an operation that results in a payment such as the use of charged contents provided by the WEB or a purchase of goods on the WEB.

In the step s4, when the input operation does not correspond to the normal operation (step s4:No), the controller performs the shooting operation by the camera (step s9). This shooting operation is originally an unnecessary process, however, the shooting operation is performed so that the user does not understand that the input operation is wrong. Accordingly, the shot image may not be actually obtained and a camouflage shooting operation (a dummy shooting operation) may be carried out by lighting by the use of the lighting device 13 and an audio output by the use of the speaker 11 so that the user or the illegal user recognizes that the shooting operation is performed.

When the user is actually shot, an image maybe stored as an evidence of the illegal user. Thus, the image is recognized afterward so that a person who tries to perform an unjust use may be followed.

The controller waits for a prescribed time (a dummy stand-by) (step s10). The stand-by time is set to substantially the same time as that of the matching of the face and decision of the steps s6 to s7. The stand-by for a prescribed time is necessary for the user or the illegal user not to understand that the matching of the face is not performed and since the input operation does not correspond to the normal operation, the user or the illegal user cannot succeed in identification.

Figure 5B:
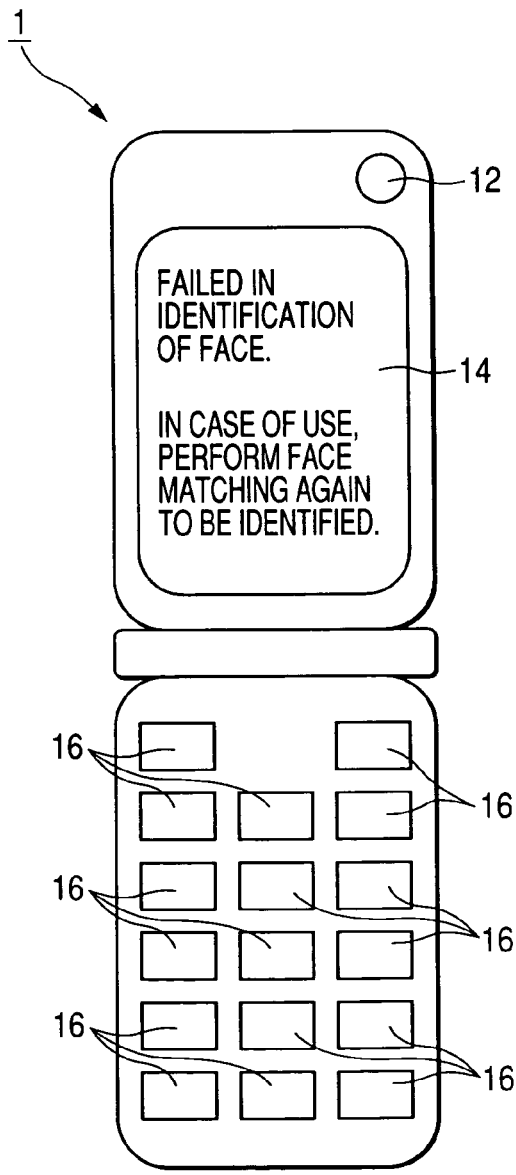

The controller shows on the liquid crystal monitor 14 a display of the failure of an identification (inform of the failure of an identification) "failed in the identification of the face. In case of use, perform again the matching of the face" (step s11), as shown in a front view of FIG. 5B, and finishes processes. Accordingly, the user cannot use a function to be used.

When it is decided that the face of the user is not the registered face in the step s7 (step s7: No), the controller shows on the liquid crystal monitor 14 a display of the failure of an identification of FIG. 5B "failed in the identification" (step s12), and finishes processes. Accordingly, the user cannot use a function to be used.

According to the above-described operations, the user accepts he identification by the input operation and the shot image, so that the user can use the necessary functions of the mobile phone. Then, in the instruction for the input for starting the shooting operation in the step s3, while the shutter button 15 is requested to be pressed down, since a pressing down operation of a button different from the shutter button 15 is actually decided to be true, even when the impersonation by a photograph is attempted, the impersonation can be rejected on the basis of the decision of the input operation.

For instance, when a key of "3" as one of the operating buttons is registered as the normal operation, since another person who does not know it presses down the shutter button 15 by looking at the display of FIG. 5A in the step s3, the decision of No is obtained in the step s4 and the failure of an identification is displayed in the step s11. Thus, another person does not move to a function that he or she tries to use.

Further, even when the input operation is not the normal operation, since the controller pretends to perform the same operation as that when the normal operation is carried out to match the face by the steps s9 to s10, the illegal user can be made not to suppose a reason of the failure of an identification.

Then, when the user fails in the identification, since the controller requests the user to be identified again by the matching of the face in the step s11, the illegal user who tries to impersonate is not aware that a problem exists in the input operation. Thus, the input operations can be avoided from being carried out like a general attack.

Further, since the input operation for deciding a truth or falseness is the input operation during the input for starting the shooting operation, the user may not be requested to perform many operations. Thus, the compatibility of the improvement of convenience with the improvement of an identifying accuracy can be realized.

Since the matching of the face is not actually carried out in the step s10, the power consumption of a battery (a battery charger) of the mobile phone can be suppressed. Especially, if the shooting operation is camouflaged in the step s9, the consumption of the power of the battery can be more suppressed.

Since the truth and falseness can be decided by the input operation as well as by the matching of the face, a threshold value for deciding the truth of the matching of the face may be mitigated or an algorithm for matching the face may be simplified. The above-described matter is extremely advantageous for the mobile information terminal in which a process at high speed is required and a consumed electric power needs to be saved.

Second Embodiment

Now, an object identifying device 1 of a second embodiment will be described below. The object identifying device 1 of the second embodiment has the same structure as that of the object identifying device 1 of the above-described first embodiment shown in FIG. 1, and is partly different therefrom as shown in a block diagram of FIG. 2.

Figure 2:
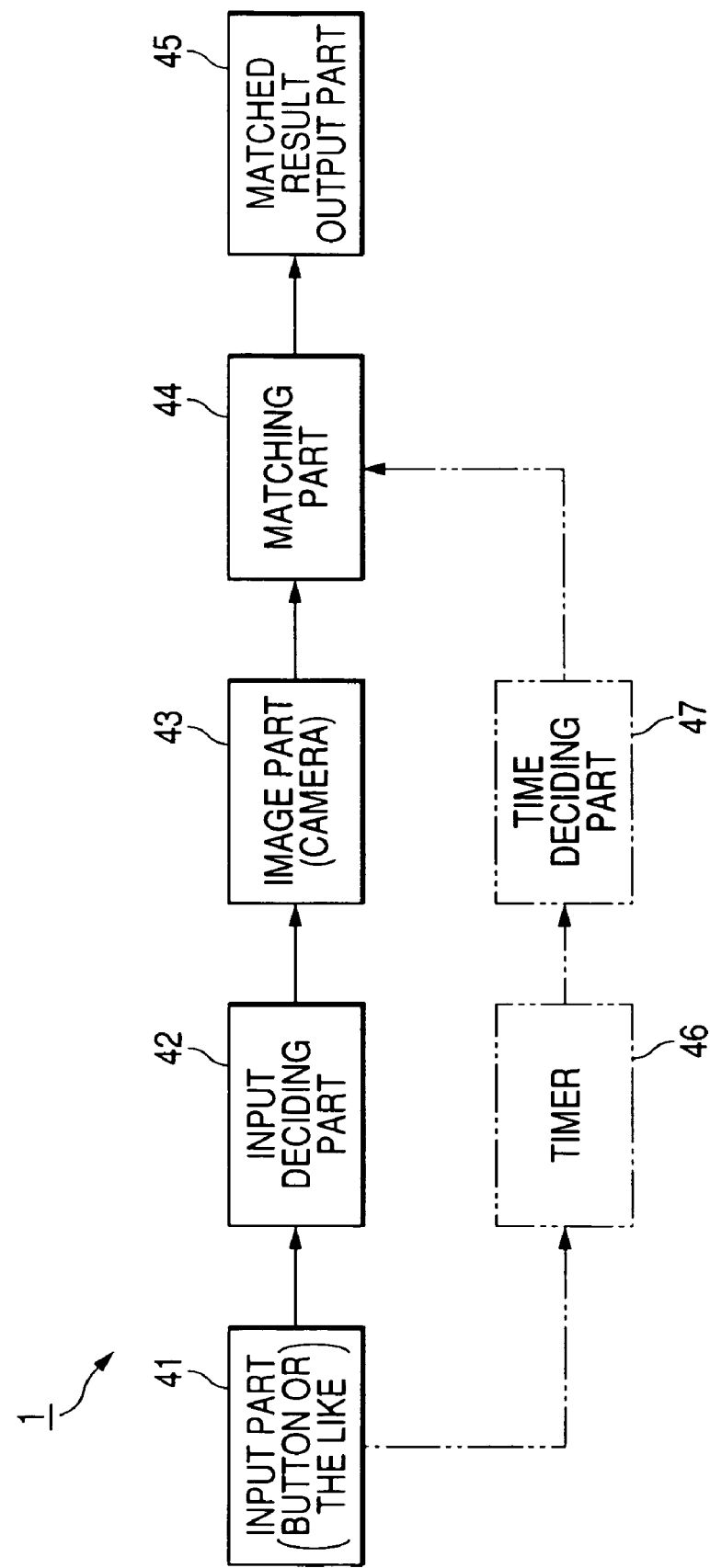
FIG. 2 is a block diagram of the exemplary, non-limiting object identifying device.

The object identifying device 1 of the second embodiment does not include the input deciding part 42 of the first embodiment and includes a timer 46 and a time deciding part 47 shown by virtual lines in FIG. 2 in place thereof.

The timer 46 is provided in a controller of the object identifying device 1 to measure a time during which an input is carried out in an input part 41, that is, a pressing down time until a shutter button 15 is released after the shutter button 15 is pressed down.

The time deciding part 47 is provided in the controller of the object identifying device 1 to decide a truth or falseness as to whether the pressing down time is near to a normal pressing down time stored as normal pressing down time data. In a deciding whether or not the pressing down time is near to the normal pressing down time, when the difference between an actual pressing down time and the registered normal pressing down time is located within a preset and prescribed threshold value, the pressing down time is decided to be near to the normal pressing down time and true. When the actual pressing down time is longer than the registered normal pressing down time, that is, when the shutter button is continuously pressed down for the registered normal pressing down time or more, the pressing down time may be decided to be true.

The prescribed threshold value is preferably composed of such a range of time as to permit an error of the pressing down time by the person himself or herself.

Since other structures are the same as those of the first embodiment, a detailed description thereof will be omitted.

According to the above-described structure, a double identification can be realized on the basis of an input operation by a user and a shot image obtained by shooting the user (an object to be shot) and an impersonation or a wrong recognition can be properly rejected.

Now, an operation performed by the controller of the object identifying device 1 in accordance with an identifying register program and an operation performed by the controller in accordance with an object identifying program will be described below.

The operations are the same as those of the first embodiment except a part thereof, only different parts will be described.

Figure 3:
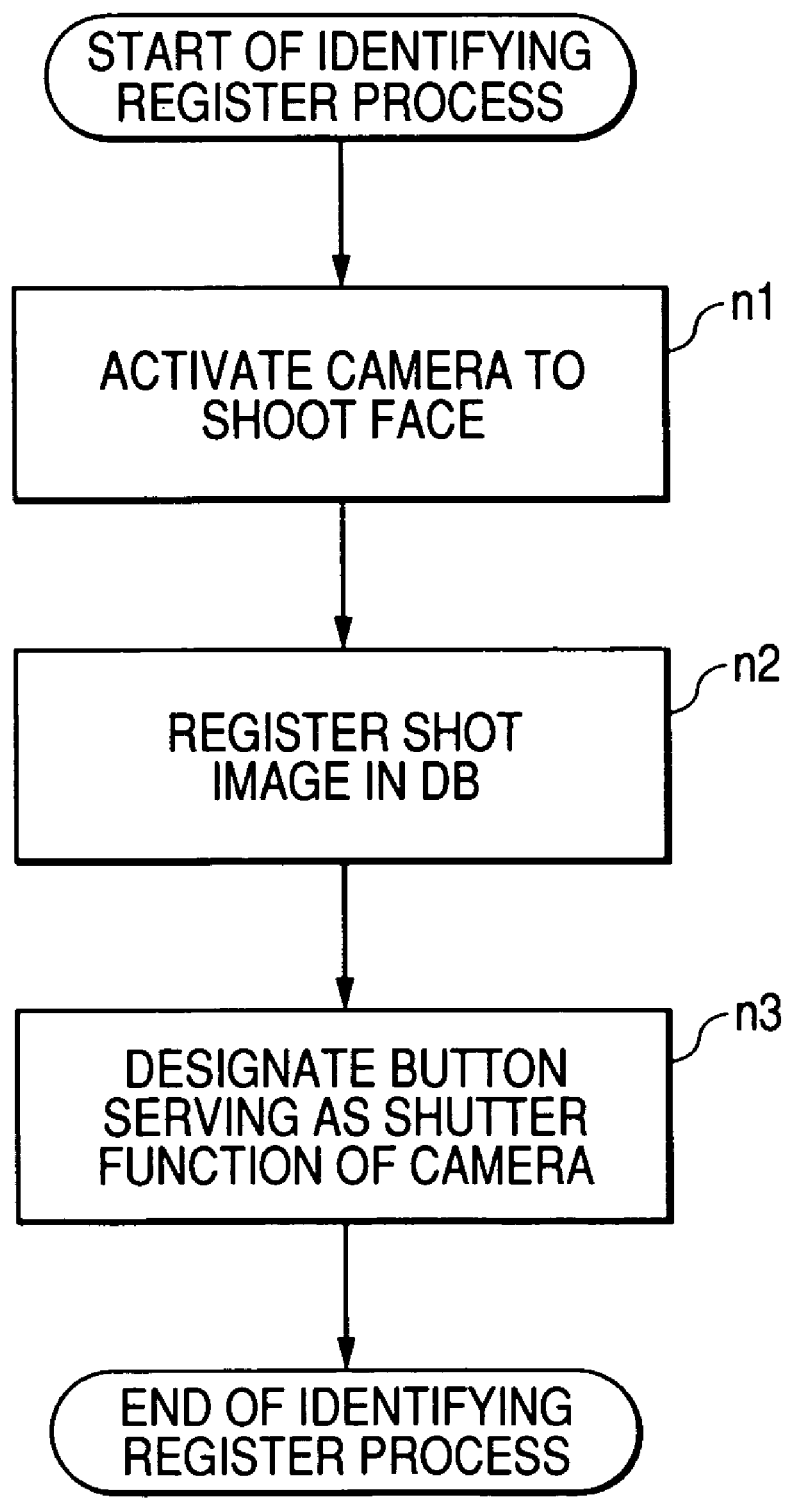
FIG. 3 is a flowchart of a exemplary, non-limiting identifying register process.

In the operation performed in accordance with the identifying register program, in step n3 shown in FIG. 3, the controller performs a process that the normal pressing down time is registered for pressing a button serving as a shutter function of a camera. Thus, the normal pressing down time is registered. The normal pressing down time is preferably registered in a suitable unit by which the decision of a truth and falseness can be made such as one second, 0.5 seconds or 0.1 seconds.

Figure 4:
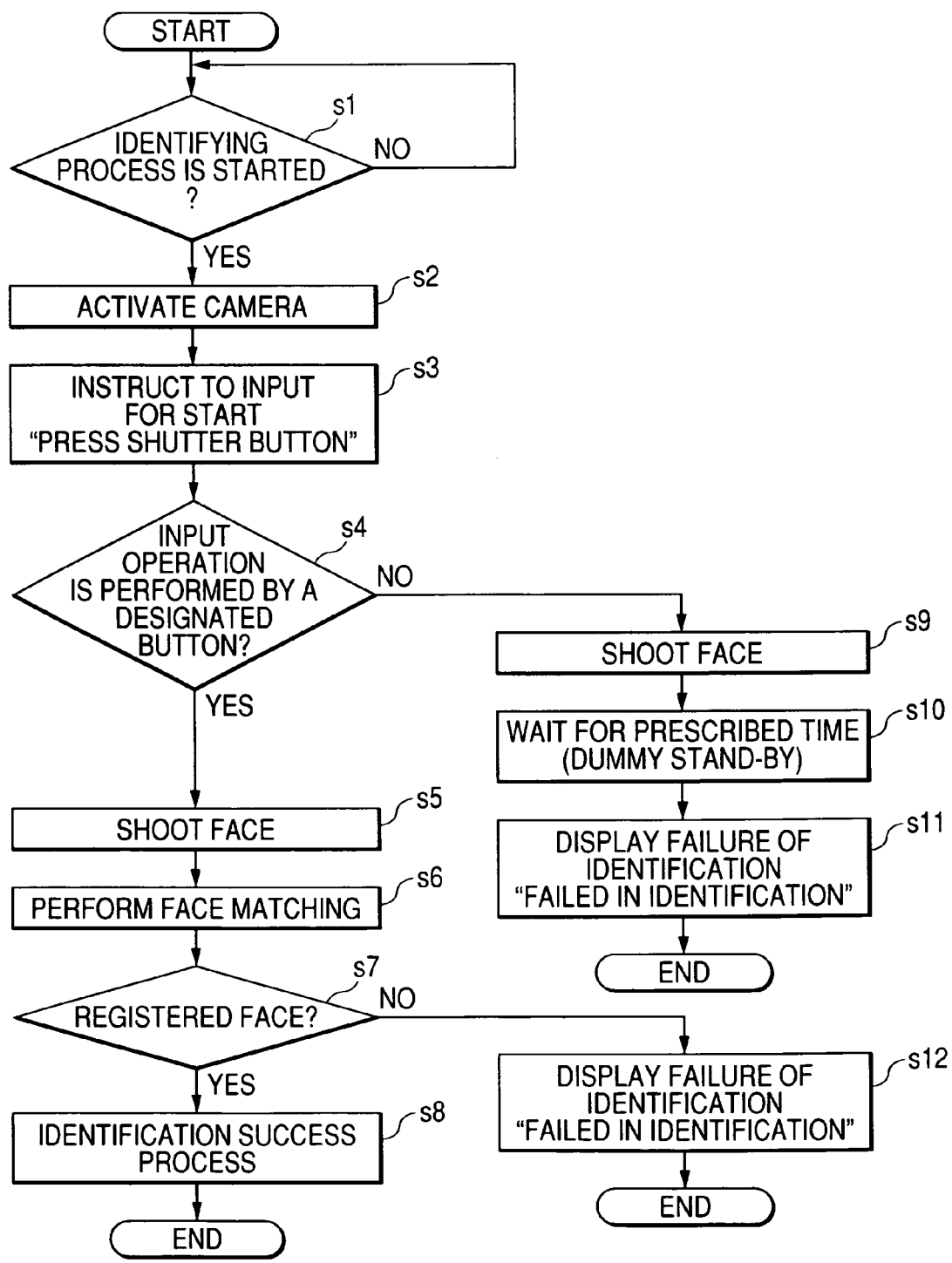
FIG. 4 is a flowchart of a exemplary, non-limiting identifying process.

In the operation performed in accordance with the object identifying program, the controller performs a process for deciding whether or not an input operated pressing down time is near to the registered normal pressing down time in step s4 shown in FIG. 4. Thus, the decision of a truth and falseness is made on the basis of the pressing down time.

Since other operations than the above-described operation is the same as those of the first embodiment, a detailed description thereof will be omitted.

According to the above-described structures and operations, the object identifying device 1 of the second embodiment can realize the same operational effects as those of the object identifying device 1 of the first embodiment.

Third Embodiment

Now, an object identifying device 1 of a third embodiment will be described. The object identifying device 1 of the third embodiment has the same structure as that of the object identifying device 1 of the above-described first embodiment shown in FIG. 1, and is partly different therefrom as shown in the block diagram of FIG. 2.

The object identifying device 1 of the third embodiment includes a timer 46 and a time deciding part 47 shown by virtual lines in FIG. 2 in addition to the structure of the first embodiment.

Since elements are respectively the same as those of the above-described first embodiment and second embodiment, a detailed description thereof will be omitted.

According to the above-described structure, a double identification can be realized on the basis of an input operation by a user and a shot image obtained by shooting the user (an object to be shot) and an impersonation or a wrong recognition can be properly rejected.

Figure 6:
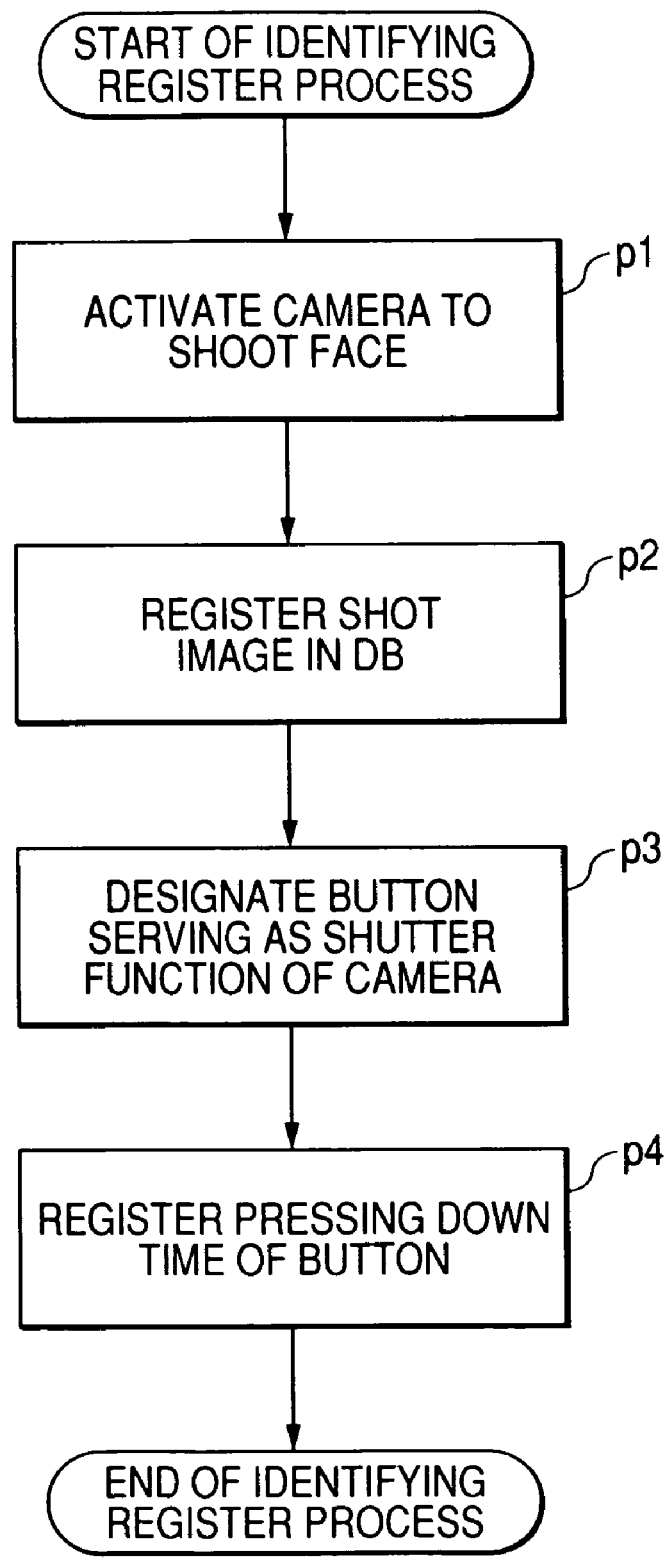
FIG. 6 is a flowchart of an identifying register process according to a third exemplary, non-limiting embodiment of the present invention.

Now, an operation of an identifying register process performed by a controller in accordance with an identifying register program will be described together with a flowchart showing an operation performed by the controller of the object identifying device 1 shown in FIG. 6.

The identifying register process shows a part of a function setting process prepared in the object identifying device 1 and is performed when the user selects the identifying register process from the function setting process.

When the identifying register process is started, the controller activates a camera 12 to shoot the face of the object to be shot and obtain the image of the face as the shot image (step p1). At this time, the controller may requests an input for starting a shooting operation to perform the shooting operation by the input for starting the shooting operation by a shutter button 15.

The controller registers the obtained shot image in a data base (DB) in the controller (step p2).

The controller requests the user to designate a normal operation to be registered by displaying a screen on a liquid crystal monitor 14 and registers a designated operation as a normal operation serving as a shutter function of the camera 12 (step p3).

Further, the controller requests the user to designate a pressing down time of a button and registers the designated pressing down time as a normal pressing down time as one of the normal operation (step p4).

The normal operations are designated by allowing the user to actually perform the input operation and the input operation is directly designated as the normal operation. Otherwise, a plurality of kinds of the normal operations is displayed on the liquid crystal monitor 14 so that an arbitrary normal operation is selected by the user to be performed.

According to the above-described operations, normal operation data and matching data can be stored in the data base.

The normal operation may not be separately designated in the step p3 and the input operation for starting the shooting operation may be obtained at the time of the step p1 and the input operation may be directly registered as the normal operation. In this case, the normal operation data and the matching data can be registered in the same procedure as that when the object is actually identified.

When the designation of the pressing down time is measured from an actual input operation, a measured time may be displayed to inform the user of the measured time.

Figure 7:
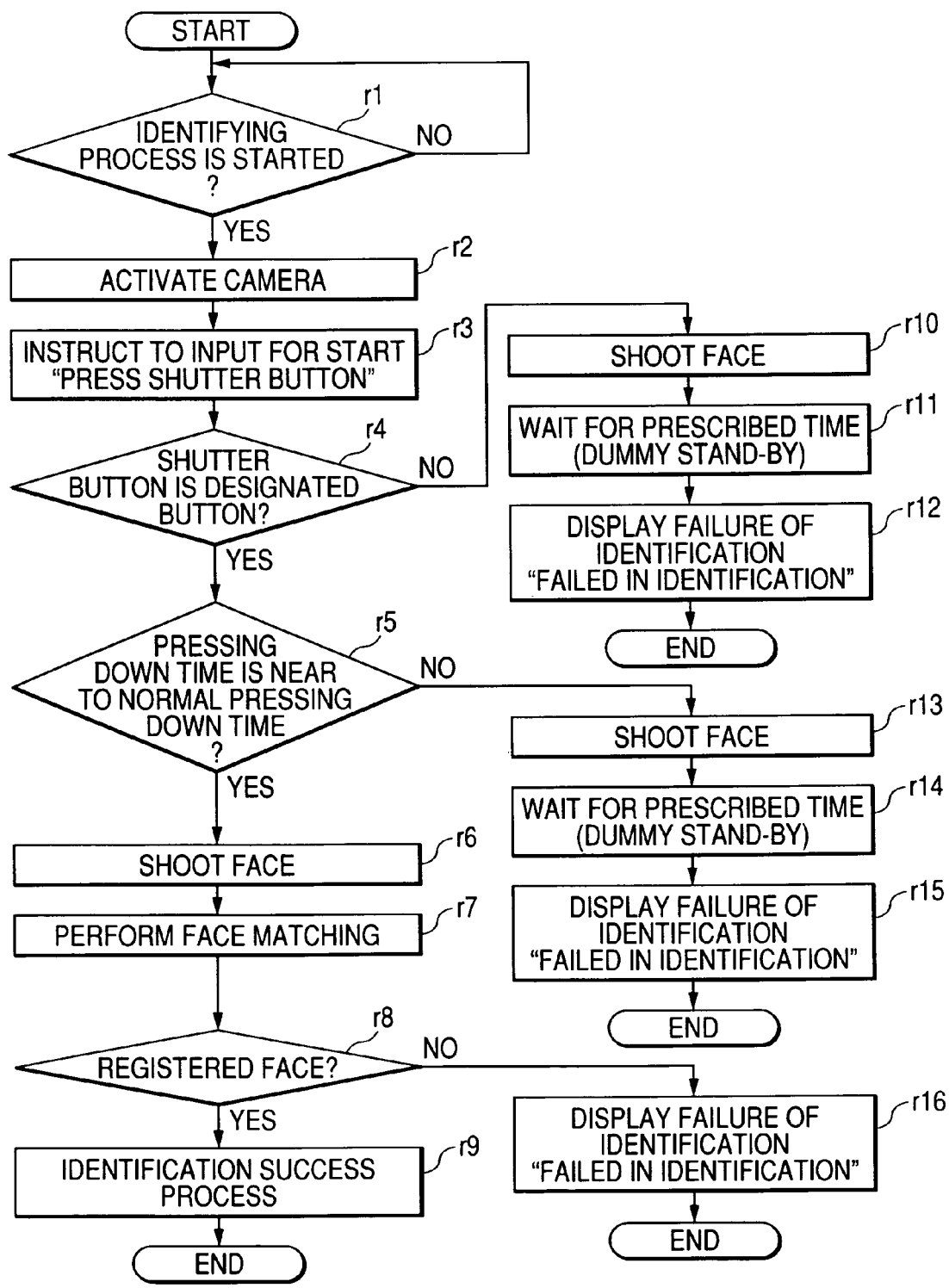
FIG. 7 is a flowchart of an identifying process according to the third exemplary, non-limiting embodiment of the present invention.

Now, an operation performed by the controller in accordance with an object identifying program will be described together with a flowchart showing the operation performed by the controller of the object identifying device 1 shown in FIG. 7.

The controller waits until an identifying process is started (step r1:No). This identifying process is designed to be started at a preset suitable timing, for instance, when the object identifying device 1 is used, when a power is turned on, when a mail is transmitted, when a mail is read, when a WEB is inspected, when a setting is changed, when registered personal information is referred to, when charged contents provided in the WEB are used, or when goods are bought on the WEB.

When the identifying process is started (step r1:yes), the controller activates the camera 12 (step r2) to show the display of "Press the shutter button" on the liquid crystal monitor 14, as shown in a front view of FIG. 5A and to instruct the user to input for starting the shooting operation (step r3).

The controller performs a truth and falseness decision as to whether or not the input operation inputted by the shutter button 15 or an operating button 16 corresponds to a designated button registered as the normal operation (step r4).

When the controller decides that the input operation corresponds the normal operation and is true (step r4:Yes), the controller further decides whether or not the pressing down time during which the shutter button 15 or the operating button 16 button is continuously pressed is near to the registered normal pressing down time (step r5).

When the controller decides that the pressing down time is close to the normal pressing down time and true (step r5:Yes), the controller performs the shooting operation by the camera 12 (step r6). Then, the controller performs the matching of a face by the shot image obtained by the shooting operation and the matching data (step r7). The matching of the face at this time is carried out in the same manner as that of the matching of the face in the step s6 of the first embodiment. In the step r5, when an actual pressing down time is longer than the registered normal pressing down time, that is, when the button is pressed down for the registered normal pressing down time or more, the pressing down time may be decided to be true.

The controller decides whether or not the face of the user is a registered face (whether the user is the same person or not) on the basis of the matched result of the matching of the face. When the face is the registered face (step r8:Yes), the controller performs an identification success process (step r9) and finishes processes. In the identification success process, the user may directly shift to a function to be used by the user or after the success of an identification is displayed on the liquid crystal monitor 14, the user may shift to a function to be used by the user. Accordingly, the user can employ functions such as turning on a power, a transmission of a mail, an inspection of a WEB, a change of a setting or a reference to registered personal information. Further, according to circumstances, as a result of the success of an identification, the user can complete an operation that results in a payment such as the use of charged contents provided by the WEB or a purchase of goods on the WEB.

In the step r4, when the input operation does not correspond to the normal operation (step r4:No), the controller performs the shooting operation by the camera 12 (step r10). This shooting operation is originally an unnecessary process, however, the shooting operation is performed so that the user does not understand that the input operation is wrong. Accordingly, the shot image may not be actually obtained and a camouflage shooting operation (a dummy shooting operation) may be carried out by lighting by the use of a lighting device 13 and an audio output by the use of a speaker 11 so that the user or the illegal user recognizes that the shooting operation is performed.

The controller waits for a prescribed time (a dummy stand-by) (step r11). The stand-by time is set to substantially the same time as that of the matching of the face and the decision of the steps r7 to r8. The stand-by for a prescribed time is necessary for the user or the illegal user not to understand that the matching of the face is not performed and since the input operation does not correspond to the normal operation, the user or the illegal user cannot succeed in identification.

The controller shows on the liquid crystal monitor 14 a display of the failure of an identification of "failed in the identification of the face. In case of use, perform again the matching of the face" (step r12), as shown in a front view of FIG. 5B, and finishes processes. Accordingly, the user cannot use a function to be used.

When the pressing down time is not near to the normal pressing down time in the step r5, that is, when the difference between the actual pressing down time and the registered normal pressing down time is a prescribed threshold value or higher (step r5:No), the dummy shooting operation, the stand-by for a prescribed time and the display of the failure of an identification are carried out (steps r13 to r15) like the steps r10 to r12. Here, the prescribed time of the step r14 is set to the same time as that of the step r11, however, may be composed of such a time as to be obtained by subtracting the processing time of the step r5 from the prescribed time of the step r11.

When it is decided that the face of the user is not the registered face in the step r8 (step r8: No), the controller shows on the liquid crystal monitor 14 a display of the failure of an identification of "failed in the identification" (step r16), and finishes processes. Accordingly, the user cannot use a function to be used.

According to the above-described operations, the same operational effects as those of the first and second embodiments can be obtained.

Further, since the truth and falseness of the input operation is decided in accordance with the two contents including the kind of the pressed operating button 16 and the pressing down time of the operating button 16, a more proper identification can be achieved.

Fourth Embodiment

Now, an object identifying device 1 of a fourth embodiment will be described. Since the structure of the object identifying device 1 of the fourth embodiment has the same structure as that of the object identifying device 1 of the first embodiment described above together with FIGS. 1 and 2, a detailed description thereof will be omitted.

Further, an operation performed by the controller of the object identifying device 1 in accordance with an identifying register program and operational effects are the same as those of the above-described first embodiment, a detailed description thereof will be omitted.

Figure 8:
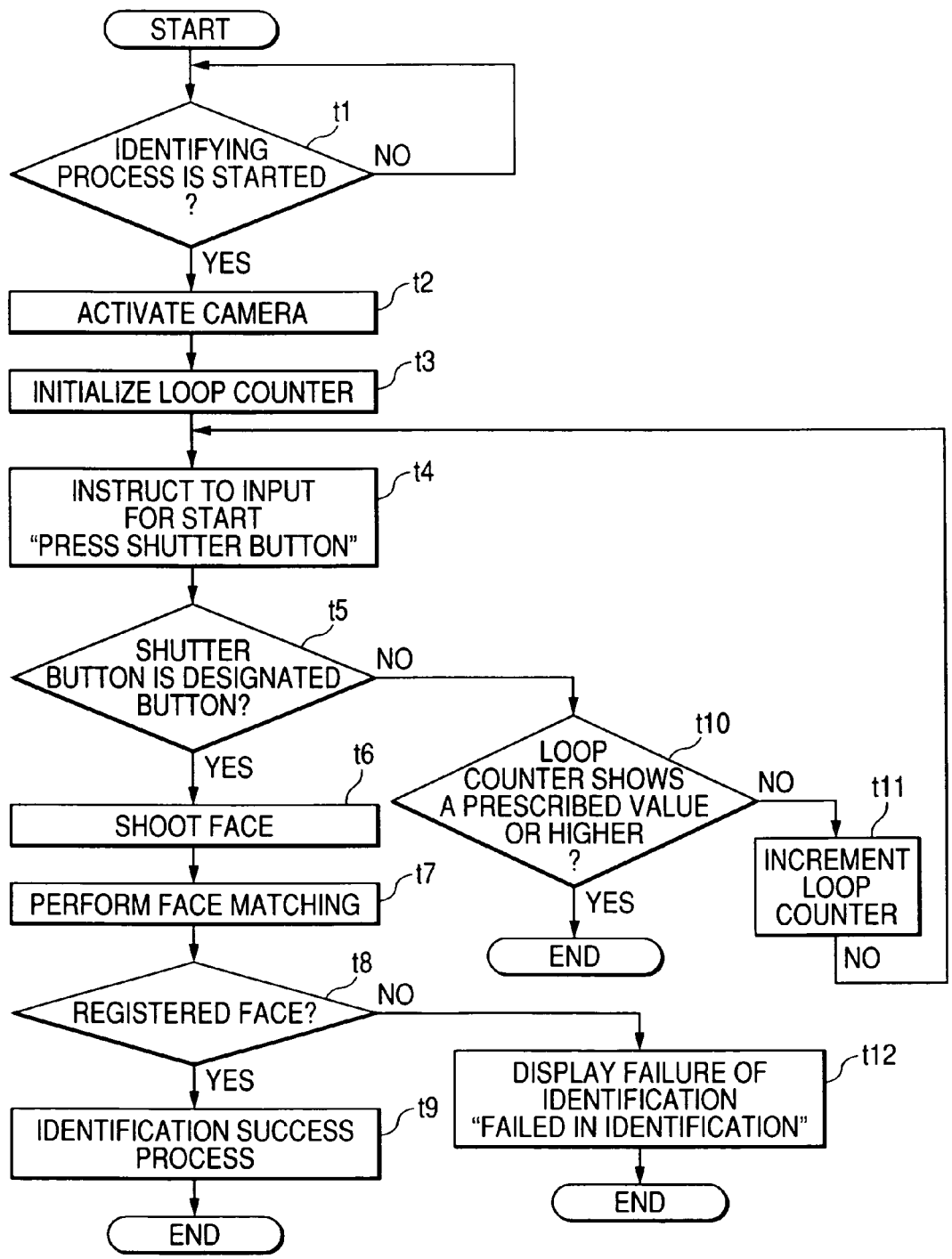
FIG. 8 is a flowchart of an identifying process according to a fourth exemplary, non-limiting embodiment of the present invention.

Now, an operation performed by the controller of the object identifying device 1 in accordance with an object identifying program will be described together with a flowchart showing the operation performed by the controller of the object identifying device 1 shown in FIG. 8.

The controller waits until an identifying process is started (step t1:No). This identifying process is designed to be started at a preset suitable timing, for instance, when the object identifying device 1 is used, when a power is turned on, when a mail is transmitted, when a mail is read, when a WEB is inspected, when a setting is changed, when registered personal information is referred to, when charged contents provided in the WEB are used, or when goods are bought on the WEB.

When the identifying process is started (step t1:Yes), the controller activates a camera 12 (step t2) to initialize a loop counter (step t3). The loop counter serves to reject subsequent identifications when the failures of an identification successively arise a prescribed number of times or more.

The succession in this case is not limited to a succession in short time, and may include a case that the failure of an identification arises again with a lapse of a prescribed time after the failure of the identification.

Then, the initialization of the loop counter (step t3) is not carried out until the identifying processes (steps t1 to t12) are completed. However, when a prescribed period of time passes such as the elapse of one day or the elapse of several days, the loop counter is initialized. During that time, even when other operations than the identifying processes are performed, the loop counter may not be initialized. Otherwise, the loop counter may not be initialized until a user succeeds in identification. In these cases, an illegal use can be more assuredly prevented in which the identifying process is temporarily stopped, and then, restarted from the first so that the user succeeds in being identified later.

The controller shows a display of "Press the shutter button" on a liquid crystal monitor 14, as shown in a front view of FIG. 5A and to instruct the user to input for starting a shooting operation (step t4).

The controller performs a truth and falseness decision as to whether or not the input operation inputted by a shutter button 15 or an operating button 16 corresponds to a designated button registered as a normal operation (step t5).

When the controller decides that the input operation corresponds to the normal operation and is true (step t5:Yes), the controller performs the shooting operation by the camera 12 (step t6). Then, the controller performs the matching of a face by a shot image obtained by the shooting operation and matching data (step t7). The matching of the face at this time is carried out in the same manner as that of the matching of the face in the step s6 of the first embodiment.

The controller decides whether or not the face of the user is a registered face (whether the user is the same person or not) on the basis of the matched result of the matching of the face. When the face is the registered face (step t8:Yes), the controller performs an identification success process (step t9) and finishes processes. In the identification success process, the user may directly shift to a function to be used by the user or after the success of an identification is displayed on the liquid crystal monitor 14, the user may shift to a function to be used by the user. Accordingly, the user can employ functions such as turning on a power, a transmission of a mail, an inspection of a WEB, a change of a setting or a reference to registered personal information.

In the step t5, when the input operation does not correspond to the normal operation (step t5:No), the controller decides whether or not the value of the loop counter is a prescribed value or higher, that is, whether or not the value is a predetermined number of times of permissions of an identification or higher (step t10).

When the value of the loop counter is the number of times of permissions of an identification or higher (step t10: yes), the controller finishes processes to reject (inhibit) subsequent identifications. At this time, a camouflage shooting operation (a dummy shooting operation) and a stand-by for a prescribed time (a dummy stand-by) may be performed so that the user or an illegal user does not understand that the matching of the face is not performed.

The user may be actually shot and an image may be stored as an evidence of the illegal user.

When the value of the loop counter is lower than the number of times of permissions of an identification (step t10:No), the controller increments the loop counter by one (add 1) (step t11) to return the process to the step t4. At this time, the camouflage shooting operation (a dummy shooting operation) and the stand-by for a prescribed time (a dummy stand-by) may be set to be performed so that the user or the illegal user does not understand that the matching of the face is not performed.

When it is decided that the face of the user is not the registered face in the step t8, the controller shows on the liquid crystal monitor 14 a display of the failure of an identification of "failed in the identification" (step t12), and finishes processes. Accordingly, the user cannot use a function to be used.

According to the above-described operations, the same operational effects as those of the first embodiment can be obtained.

Furthermore, when the failure in the identification continuously arises a prescribed number of times, the subsequent identifications are rejected, so that an unjust use by input operations like a general attack can be prevented.

Further, even when a normal user performs a wrong input, the user can repeatedly perform inputs several times smaller than a prescribed number of times. Thus, the identification of the normal user can be prevented from being rejected.

Fifth Embodiment

Now, an object identifying device 1 of a fifth embodiment will e described. Since the structure of the object identifying device 1 of the fifth embodiment has the same structure as that of the object identifying device 1 of the second embodiment, a detailed description thereof will be omitted.

Further, an operation performed by the controller of the object identifying device 1 in accordance with an identifying register program and operational effects are the same as those of the above-described second embodiment, a detailed description thereof will be omitted.

Figure 9:
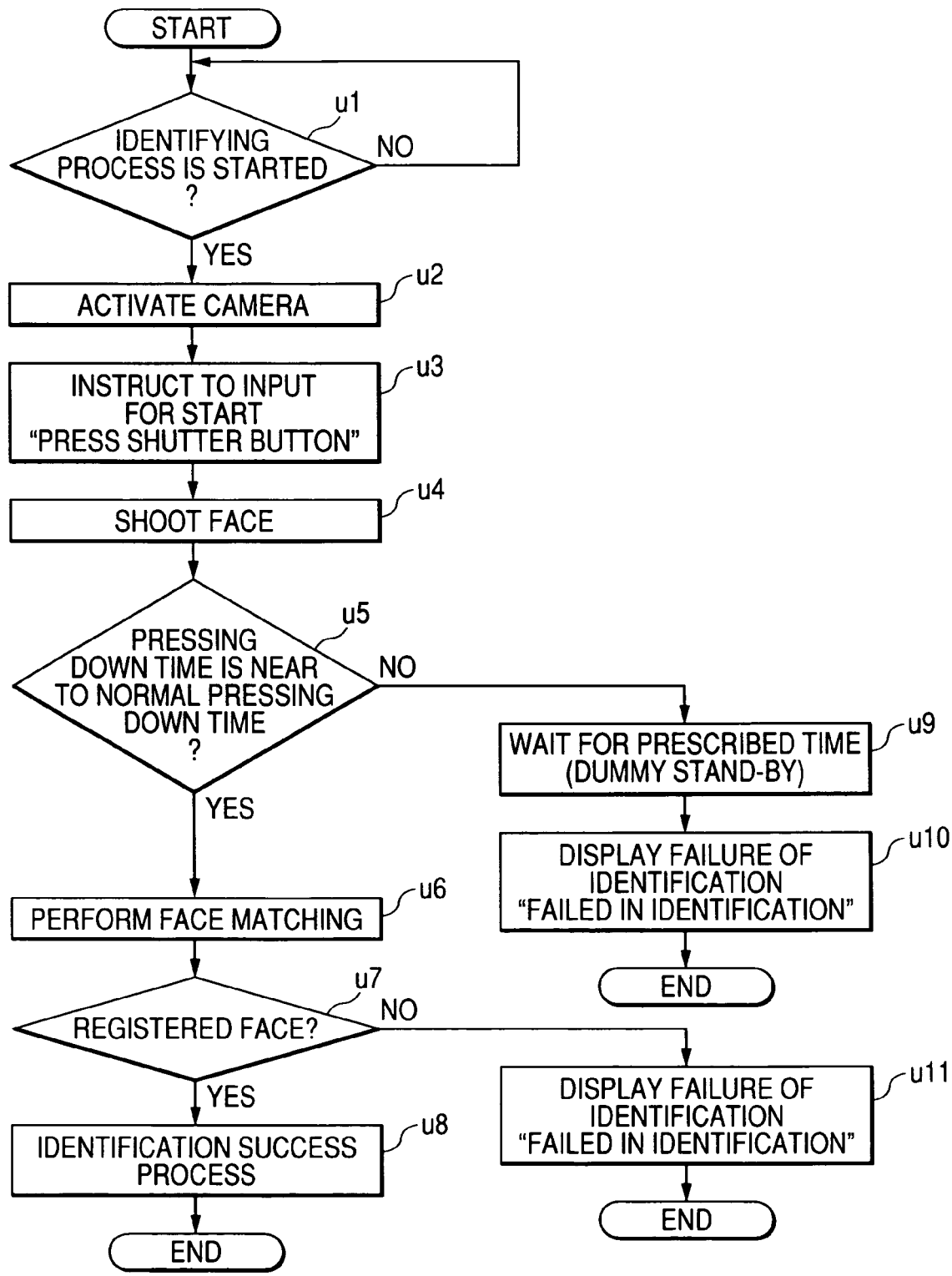
FIG. 9 is a flowchart of an identifying process according to a fifth exemplary, non-limiting embodiment of the present invention.

Now, an operation performed by the controller of the object identifying device 1 in accordance with an object identifying program will be described together with a flowchart showing the operation performed by the controller of the object identifying device 1 shown in FIG. 9.

The controller waits until an identifying process is started (step u1:No). This identifying process is designed to be started at a preset suitable timing, for instance, when the object identifying device 1 is used, when a power is turned on, when a mail is transmitted, when a mail is read, when a WEB is inspected, when a setting is changed, when registered personal information is referred to, when charged contents provided in the WEB are used, or when goods are bought on the WEB.

When the identifying process is started (step u1:Yes), the controller activates a camera 12 (step u2) to show the display of "Press the shutter button" on a liquid crystal monitor 14, as shown in a front view of FIG. 5A and to instruct the user to input for starting a shooting operation (step u3).

The controller receives the input for starting the shooting operation to perform the shooting operation by the camera 12 (step u4). Then, the controller decides whether or not a pressing down time until the user stops the pressing down operation of a shutter button 15 or an operating button 16 button to be released after the user performs the shooting operation is near to a previously registered normal pressing down time, that is, whether or not the difference between the actual pressing down time and the registered normal pressing down time is located within a range of a predetermined threshold value (step u5).

When the controller decides that the pressing down time is close to the normal pressing down time (step u5:Yes), the controller performs the matching of a face by the shot image obtained by the shooting operation in the step u4 and matching data (step u6). The matching of the face at this time is carried out in the same manner as that of the matching of the face in the step s6 of the first embodiment. In the step u5, when the actual pressing down time is longer than the registered normal pressing down time, that is, when the button is pressed down for the registered normal pressing down time or more, the pressing down time may be decided to be true.

The controller decides whether or not the face of the user is a registered face (whether the user is the same person or not) on the basis of the matched result of the matching of the face. When the face is the registered face (step u7:Yes), the controller performs an identification success process (step u8) and finishes processes. In the identification success process, the user may directly shift to a function to be used by the user or after the success of an identification is displayed on the liquid crystal monitor 14, the user may shift to a function to be used by the user. Accordingly, the user can employ functions such as turning on a power, a transmission of a mail, an inspection of a WEB, a change of a setting or a reference to registered personal information. Further, according to circumstances, as a result of the success of an identification, the user can complete an operation that results in a payment such as the use of charged contents provided by the WEB or a purchase of goods on the WEB.

In the step u5, when the difference between the actual pressing down time and the registered normal pressing down time is not located within the range of the predetermined threshold value (step u5:No), a stand-by (a dummy stand-by) for a prescribed time is carried out (step u9). The stand-by for a prescribed time is necessary for the user or an illegal user not to understand that the matching of the face is not performed and the user or the illegal user cannot succeed in being identified because of the input operation.

The controller shows on the liquid crystal monitor 14 a display of the failure of an identification of "failed in the identification of the face. In case of use, perform again the identification of the face" (step u10), as shown in a front view of FIG. 5B, and finishes processes. Accordingly, the user cannot use a function to be used.

When it is decided that the face of the user is not the registered face in the step u7 (step u7: No), the controller shows on the liquid crystal monitor 14 a display of the failure of an identification of "failed in the identification" (step u11), and finishes processes. Accordingly, the user cannot use a function to be used.

According to the above-described operations, the same operational effects as those of the second embodiment can be realized.

Further, since to continuously press down the button is ordinarily hardly considered as a condition of identification, an impersonation using a photograph can be properly rejected.

Sixth Embodiment

Figure 10:
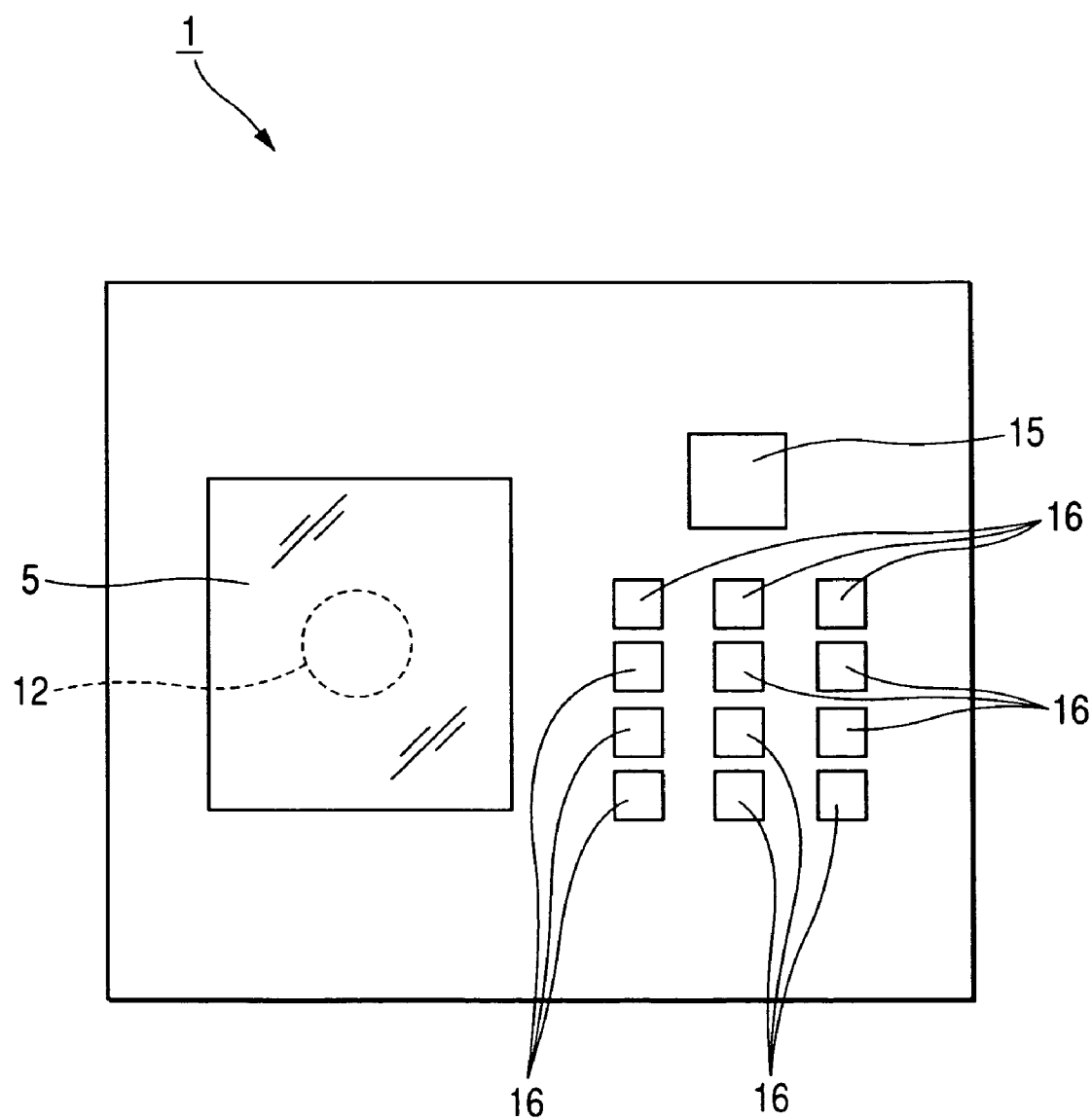
FIG. 10 is a front view of an object identifying device according to a sixth exemplary, non-limiting embodiment of the present invention.

Now, as a sixth embodiment, an installed type object identifying device 1 provided in an entrance and exit of facilities will be described by referring to a front view of FIG. 10 in place of a mobile phone.

In the object identifying device 1, a transparent or translucent protecting plate 5 is provided on the surface of the left side. A camera 12 is provided in the protecting plate 5. A shutter button 15 is provided on the surface of the right side. A plurality of operating buttons 16 are arranged in the form of a matrix in the lower part of the shutter button 15. A controller is provided in an inner part.

A difference from the first to fifth embodiments resides in that a liquid crystal monitor is not provided.

Since other structures and operations are the same as those of the first to fifth embodiments except that in place of a display on the liquid crystal monitor, an audio having the same contents of the display is outputted by an incorporated speaker, a detailed description thereof will be omitted.

It is to be understood that the liquid crystal monitor may be provided as a display function.

According to the above-described structures and operations, the same operational effects as those of the first to fifth embodiments can be achieved. Then, in an identification success process, an operation can be carried out that meets a position where the object identifying device is provided, for instance, a door lock is unlocked or a passage is permitted.

In the corresponding relation between the structure of the present invention and the embodiments, the face identifying device and the mobile phone of the present invention correspond to the object identifying device 1 of the embodiment. Similarly, the control unit corresponds the controller of the object identifying device 1. The shooting unit corresponds to the camera 12 and the image part 43. The input request unit corresponds to the liquid crystal monitor 14. The input unit and the push button correspond to the operating button 16 or the shutter button 15 and the operating button 16. The truth and falseness deciding process corresponds to the steps s4, r4, r5, t5 and u5. The matching process corresponds to the steps s6 to s7, r7 to r8, t7 to t8 and u6 to u7. The identifying process corresponds to the steps s4, s7, r4, r8, t5, t8, u5 and u7. The object identifying program corresponds to the object identifying program. The registered data corresponds to the matching data.

However, the present invention is not limited only to the above-described embodiments, many embodiments may be realized.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

[Designation of Document] Drawing

[FIG. 2]
41 . . . input part (button or the like)
42 . . . input deciding part
43 . . . image part (camera)
44 . . . matching part
45 . . . matched result output part
46 . . . timer
47 . . . time deciding part

[FIG. 3]
n1. Activate camera to shoot face.
n2. Register shot image in DB.
n3. Designate button serving as shutter function of camera.
a. start of identifying register process
b. end of identifying register process.

[FIG. 4]
s1. Identifying process is started ?
s2. Activate camera.
s3. Instruct to input for start "press shutter button".
s4. Input operation is performed by a designated button ?
s5. Shoot face.
s6. Perform face matching.
s7. Registered face ?
s8. Identification success process.
s9. Shoot face.
s10. Wait for prescribed time (dummy standby)
s11. Display failure of identification "failed in identification".
s12. Display failure of identification "failed in identification".
a. start
b. end [FIG. 5]
a. This is face identifying mode. Press shutter button. (Failed in identification of face.
b. In case of use, perform face matching again to be identified.
[FIG. 6]
p1. Activate camera to shoot face.
p2. Register shot image in DB.
p3. Designate button serving as shutter function of camera.
p4. Register pressing down time of button
a. start of identifying register process
b. end of identifying register process. [FIG. 7]
r1. Identifying process is started ?
r2. Activate camera.
r3. Instruct to input for start "press shutter button".
r4. Shutter button is designated button ?
r5. Pressing down time is near to normal pressing down time ?
r6. Shoot face.
r7. Perform face matching.
r8. Registered face ?
r9. Identification success process.
r10. Shoot face.
r11. Wait for prescribed time (dummy stand-by)
r12. Display failure of identification "failed in identification".
r13. Shoot face.
r14. Wait for prescribed time (dummy stand-by)
r15. Display failure of identification "failed in identification".
r16. Display failure of identification "failed in identification".
a. start
b. end [FIG. 8]
t1. Identifying process is started ?
t2. Activate camera.
t3. Initialize loop counter.
t4. Instruct to input for start "press shutter button".
t5. Shutter button is designated button ?
t6. Shoot face.
t7. Perform face matching.
t8. Registered face ?
t9. Identification success process.
t10. Loop counter shows a prescribed value or higher ?
t11. Increment loop counter.
t12. Display failure of identification "failed in identification".
a. start
b. end [FIG. 9]
u1. Identifying process is started ?
u2. Activate camera.
u3. Instruct to input for start "press shutter button".
u4. Shoot face.
u5. Pressing down time is near to normal pressing down time ?
u6. Perform face matching.
u7. Registered face ?
u8. Identification success process.
u9. Wait for prescribed time (dummy stand-by)
u10. Display failure of identification "failed in identification".
u11. Display failure of identification "failed in identification".
a. start
b. end

I claim:

1. An object identifying device comprising:
a shooting unit configured to shoot an object to obtain a shot image;
a plurality of buttons comprising operating buttons and a shutter button;
an input request unit configured to request a user to perform an input operation using at least one of the buttons; and
a control unit configured to control the input request unit and the input unit, and is further configured to perform:
an identifying process that identifies the object,
a register process that registers, as a predetermined operation, actuation of at least one of the buttons that causes the shooting unit to shoot the user as the object,
a truth and falseness deciding process that compares the input operation that is received by the input unit in response to the request from the input request unit with the pre-registered operation, and
a matching process performed when the input operation matches the pre-registered operation that compares the shot image with the pre-registered image data of the object;
wherein the identifying process identifies the object as a pre-registered image in the case where the input operation matches the pre-registered operation and the shot image matches the pre-registered image data.

2. The object identifying device according to claim 1, wherein the pre-registered operation includes actuation of one of the operating buttons.

3. The object identifying device according to claim 2, wherein the pre-registered operation includes pressing down the at least one of the buttons for a predetermined time.

4. The object identifying device according to claim 1, wherein the pre-registered operation includes pressing down the at least one of the buttons for a predetermined time.

5. The object identifying device according to claim 1, wherein the control unit is configured to cause to the shooting unit to simulate to shoot the object in the case where the input operation does not match the pre-registered operation.

6. A face identifying device comprising the object identification device according to claim 1, wherein the object to be shot is a face of the user.

7. A mobile phone comprising the object identifying device according to claim 1.

8. An object identifying method comprising:
performing an input request process that requests a user to perform an input operation using at least one of a plurality of buttons of an object identifying device, wherein the plurality of buttons comprise operating buttons and a shutter button;
performing an identifying process that identifies an object;
performing a register process that registers, as a pre-registered operation, actuation of at least one of the buttons that cause a shooting unit to shoot the user as the object;
performing a truth and falseness deciding process that compares the input operation that is received from the user in response to the input request process with the pre-registered operation; and
performing a matching process when the input operation matches the pre-registered operation that compares the shot image with pre-registered image data of the object,
wherein the identifying process identifies the object as a pre-registered image in the case where the input operation matches the pre-registered operation and the shot image matches the pre-registered image data.

9. The object identifying method according to claim 8, the method further comprising:
causing the shooting unit to simulate to shoot the object in the case where the input operation does not match the pre-registered operation.

10. A computer readable medium comprising instructions, that when executed on a microprocessor, perform the following:
causing an object identifying device to perform the object identifying method according to claim 8.

* * * * *